United States Patent [19]

Quadair

[11] Patent Number: 4,891,343
[45] Date of Patent: Jan. 2, 1990

[54] STABILIZED ZIRCONIA

[75] Inventor: Taria Quadair, Columbia, Md.

[73] Assignee: W. R. Grace & Co.-Conn., New York, N.Y.

[21] Appl. No.: 230,634

[22] Filed: Aug. 10, 1988

[51] Int. Cl.$^4$ .............................................. C04B 35/48
[52] U.S. Cl. ..................................... 501/103; 501/152
[58] Field of Search .................................. 501/152, 103

[56] References Cited

U.S. PATENT DOCUMENTS

| | | | |
|---|---|---|---|
| 3,514,252 | 5/1970 | Levy et al. | 423/275 |
| 3,634,113 | 1/1972 | Fehrenbacher | 501/103 |
| 4,507,394 | 3/1985 | Mase et al. | 501/103 X |
| 4,520,114 | 5/1985 | David | 501/103 X |
| 4,587,225 | 5/1986 | Tsakuma et al | 501/103 X |
| 4,610,967 | 9/1986 | Imanishi et al. | 501/103 |
| 4,659,680 | 4/1987 | Gile | 501/103 X |
| 4,690,910 | 9/1987 | Tsukuma et al. | 501/103 |
| 4,690,911 | 9/1987 | Nakada | 501/103 X |

FOREIGN PATENT DOCUMENTS

| | | | |
|---|---|---|---|
| 0151335 | 8/1985 | European Pat. Off. | 501/103 |
| 1021969 | 1/1986 | Japan | 501/103 |

Primary Examiner—Mark L. Bell
Assistant Examiner—Karl Group
Attorney, Agent, or Firm—Edward J. Cabic

[57] ABSTRACT

Ceramic tetragonal zirconia is stabilized against transformation to the undersirable monoclinic form by incorporation of a mixture of stabilizers comprising controlled amounts of dysprosia and ceria, together with either yttria or titania (or both). The mixture can be prepared by wet-mixing zirconia with nitrates of the stabilizer materials, followed by drying, then calcining, e.g., at 650° C. to drive off decomposition products, and then sintering at, e.g., 1465°–1475° C.

12 Claims, No Drawings

STABILIZED ZIRCONIA

BACKGROUND OF THE INVENTION

1. Field of the Invention

This invention relates to ceramics, and more particularly to improving the properties of ceramic zirconia.

2. Description of the Previously Published Art

Because of its toughness, wear resistance, hardness, low thermal conductivity, and other properties, zirconia ($ZrO_2$) has found numerous ceramic applications. Typical of these uses (e.g., in gasoline or diesel engines) are wear buttons for valve tappets; valve seats; oxygen sensor sleeves; piston caps (for diesels), and precombustion chamber elements (for diesels). Typical non-auto engine uses include grinding balls, dies, check valves and the like.

Zirconia competes with or has replaced other ceramics for the above uses.

In all of the above uses the zirconia is prepared in a particular crystal morphology, viz., in tetragonal form. There are three commonly occurring and established crystal forms of zirconia: cubic, tetragonal, and monoclinic. Cubic is the normal form at high temperature. The tetragonal form can exist at room temperature, but is metastable and under stress tends to transform to the monoclinic form, with increase in volume and loss of various important properties. The form of zirconia desired for practically all the above mentioned ceramic end uses is the tetragonal. However the tetragonal in the unstabilized form, unfortunately, tends to convert to the less desirable monoclinic form, even on standing at room temperature. This conversion is also grain size dependent, the larger the grain size the easier the transformation. Transformation may be quite rapid under stress unless the zirconia is pre-stabilized in some way. It is of course also temperature dependent.

Various modifications and/or treatments of zirconia have been tried in efforts to minimize conversion of tetragonal to the monoclinic form. One approach is to use extremely fine zirconia powder such as less than 200 Angstrom units as reported in *Jour. Phys. Chem*, 69, 1238 (1965). Another approach is to add one or more stabilizers. The addition of yttria ($Y_2O_3$) and ceria ($CeO_2$) to stabilize the tetragonal zirconia system has been reported in *Jour. Mat. Sci.*, 20, 3988–3992 (1985). In U.S. Pat. No. 4,753,902 zirconia is stabilized with two components. The first is from 5 to 45 mole percent titania. The second can be either (a) up to 10 mole percent of rare earth oxide, (b) up to 7 mole percent yttria or (c) up to 20 mole percent ceria.

3. Objects of the Invention

It is an object of the invention to provide a stabilized tetragonal zirconia which is cost effective. These properties include improved flexural strength, low temperature stability, fracture toughness, and hardness; improved resistance to thermal shock, abrasion and erosion; and others.

It is a further object to stabilize ceramic zirconia with dysprosia, ceria, and a third component which is either yttria or titania.

It is also an object to provide shaped zirconia ceramics of superior thermal and mechanical properties.

These and further objects will become apparent as the description of the invention proceeds.

SUMMARY OF THE INVENTION

The present invention is directed towards lowering the cost by addition of small amounts of a three component stabilizer to tetragonal zirconia which comprises a mixture of dysprosia ($Dy_2O_3$), ceria, and a third stabilizer which is either yttria or titania. The stablized zirconia composition on a molar basis is made of (A) between 0.3–1.3 percent dysprosia; (B) between 7.0–8.5 percent ceria; (C) a third stabilizer which is either (i) between 0.5–0.8 percent yttria; (ii) between 0.8–1.5 percent titania; or (iii) mixtures of (i) and (ii) containing up to a combined total of 2.3 percent; and (D) the balance making 100 percent being zirconia in the tetragonal form as determined by Xray diffraction. When ceramic zirconia is used industrially for its toughness and low thermal conductivity, it is preferred that the zirconia be in its tetragonal crystalline form. It is this form which presents the most desirable properties including fracture resistance. The stress around a crack tip tends to convert tetragonal zirconia into the monoclinic form, impeding the crack growth and hence resulting in toughening of the system, which is the so-called "stress-induced transformation". We have found that the combination of the stabilizers, $Dy_2O_3$, $CeO_2$, and $Y_2O_3$ and/or $TiO_2$, in the specified amounts when added to the zirconia system lowers the tetragonal to monoclinic transformation temperature so that the tetragonal phase is retained at room temperature. Thus it is the multiple effect in appropriate combination of $Dy_2O_3$ and $CeO_2$ with either $Y_2O_3$ or $TiO_2$ which is utilized to retain the tetragonal phase at room temperature.

DESCRIPTION OF THE PREFERRED EMBODIMENTS

As recognized by one skilled in the art, the preferred starting particle size of $ZrO_2$ powder is a tradeoff between finer sizes for increased reactivity sintering and larger sizes for easier powder handling during processing. In the case described herein, the $ZrO_2$ powder preferably has an average particle size below about 20,000 Angstrom units since the smaller, more reactive particle size aids sintering. For zirconia particles sizes below 200 Angstrom units the present stabilizer system may become somewhat less effective, since material this fine is fairly stable anyhow as discussed in the *J. Phys. Chem.* article. It may be noted that zirconia at 200 Angstrom units, so far as is known, is not available commercially in non-agglomerated form. Thus the zirconia average particle size above 200 Angstrom units is preferred. Zirconia powder which is commercially available as agglomerates averaging less than about 1.0 micron in size is a preferred material. In such commercial powders, the zirconia is in the monoclinic form, except for the finest particles, which may be in the tetragonal form. On sintering, the stabilizers diffuse into the zirconia and it changes to the tetragonal form.

Sources of yttria, dysprosia, and ceria include the preferred nitrates as well as other soluble salts such as oxalates, acetates, chlorides, etc. Also, the stabilzers can be added simply as oxides, in which case the calcination step to decompose the salts can be omitted. Solvents for the stabilizers in salt form include the preferred low cost water as well as other solvents such as isopropyl alcohol, acetone, etc. When all the materials are in the oxide form, their solubility becomes irrelevant, and the liquid simply becomes a dispersion medium.

Zirconia can be admixed with the other ingredients in any conventional high shear mixer. It is preferred to have the slurry mixture carry at least about 70 weight % solids loading.

Substantially any conventional process may be used for drying the slurry mixture such as a roto drier, a spray drier, a freeze drier, etc.

When the stabilizers are added in salt form, the calcining temperature used to decompose the salts may vary in the range of from about 500° to 800° C.

The $ZrO_2$ powder, which has either a calcined salt, dried oxide or a mixture, is milled for a period of time sufficient to provide complete homogeneity. The milling time will also depend on the particle size desired in the product. For a $ZrO_2$ with an initial particle size in the range of about 6 down to 1 microns, a preferred milling time is in the range 8–12 hours.

The dry powder can be pressed into greenware shapes for sintering, e.g., at pressures of 8,000–15,000 psi as conventionally used.

Sintering is the final step, and this should be carried out in a furnace with the product exposed to air, at about 1430°–1500° C. for about 1–3 hours, and preferably about 1465°–1475° C. for about 2–3 hours. Higher temperatures could be used, but the grain size would adversely increase.

In addition to the dysprosia and ceria stabilizer, the third component stabilizer utilized is either yttria or titania or a mixture of these two stabilizers containing up to a combined total of 2.3 mole %. Also, additional stabilizers known in the art such as MgO may be added in minor amounts such as up to 2 mole percent with the three component stabilizer of this invention. Table 1 below illustrates the ranges for the stabilized $ZrO_2$ compositions.

TABLE 1

Stabilized Zirconia Compositions

| Ingredient | Mole Percent Broad Range | Mole Percent Preferred Range |
|---|---|---|
| Dysprosia | 0.3–1.3 | 0.3–1.0 |
| Ceria | 7.0–8.5 | 8–8.5 |
| Yttria or Titania | | |
| a. Yttria | 0.5–0.8 | 0.5–0.6 |
| b. Titania | 0.8–1.5 | .9–1.0 |

Zirconia in tetragonal form, balance to make 100 mole percent.

Having described the basic aspects of the invention, the following examples are given to illustrate specific embodiments thereof.

EXAMPLE 1

This example describes the preparation of a stabilized zirconia composition according to the present invention.

The following ingredients were assembled:
$ZrO_2$=111.76 g, 90.7 mole percent, average particle size about 0.5 micron.
$Y_2O_3$=129 g, 0.5 mole percent (from $Y(NO_3)_3$)
$Dy_2O_3$=1.12 g, 0.3 mole percent (from $Dy(N0_3)_3$)
$CeO_2$=14.6302 g, 8.5 mole percent (from $Ce(NO_3)_4$)

The nitrates were mixed in 300 ml water with stirring until completely dissolved. The monoclinic zirconia powder (Z-Tech Corp. New Hampshire) was then added to the solution, and the slurry was thoroughly mixed in a ½-liter plastic jar with ½ inch alumina balls. The slurry was then dried under a heat lamp to form a powder. The powder was calcined at 650° C. for 1 hour to decompose the nitrates to the oxide form. The calcined powder was milled in a ball mill for 8 hours, and the processed powder was dry-pressed into a ceramic shape (0.24×0.15 inch cross section) and sintered in a furnace in air at 1465° C. for 3 hours.

EXAMPLE 2–6

Examples 2–6 were carried out by the same general procedure of Example 1 with the ingredients set forth in Table 2 below.

EXAMPLE 7

The products from Examples 1 to 6 were analyzed using conventional test procedures described below with the results reported in Table 2.

Flexural strength. Four-point bend test. The specimens/bars were tested under the following conditions:
Span: Inner=0.5". Outer=1.0".
Cross head speed: 0.02 in/min.
Width of the bar (approx.)=0.1900 inches.
Thickness of the bar (approx.)=0.1300 inches.
Machine: Instron.

Low temperature stability: This test is performed in an autoclave maintained at 200° C. The water vapor pressure was 100 psi (this was generated by addition of approximately 3–4 ml of water at room temperature). The samples were held under the above conditions for 250 hours. The testing for degradation in strength was done using a dye penetrant and later tested for flexural strength.

Fracture toughness: This was measured using the indentation and the pre-notched beam technique. The experiments were done at 10–20 kg load.

Hardness: Vickers hardness was measured using 1 kg load.

Thermal shock. The theory of thermal shock evaluation is described by Hassellman in J. Amer. Ceram. Soc., Vol 52, No. 11 pages 600–604 (1969). Following Hassellman's technique the samples were heated to the desired temperature and equilibrated at that temperature for ten minutes before they were instantaneously quenched into the room temperature bath (at 25° C.) which was agitated vigorously when the sample was placed in the bath to maintain the bath at its constant temperature. The difference between the heated temperature and the room temperature quench is reported as the delta temperature in the thermal shock valve in Table 2 through which the sample survived.

Erosion test. Six zirconia specimens sit on a rotating disk in a chamber. No. 36 SiC grit is blasted at the disk at 50 psi, at a 2 inch distance from samples. Comparisons were made to commercially available ceramic materials.

Thermal expansion: An Orton Dilatometer was used.

TABLE 2

Influence of Stabilizers on Zirconia Mole Percent

| Ingredient | Ex. 1 | Ex. 2 | Ex. 3 | Ex. 4 | Ex. 5 | Ex. 6 |
|---|---|---|---|---|---|---|
| $ZrO_2$ | 90.7 | 91.0 | 88.7 | 90.0 | 90.1 | 90.5 |
| $Dy_2O_3$ | 0.3 | 1.0 | 0.8 | 0.5 | 0 | 0.5 |
| $Y_2O_3$ | 0.5 | 0 | 0 | 0 | 0.9 | 0 |
| $CeO_2$ | 8.5 | 7.0 | 8.0 | 8.0 | 7.0 | 8.0 |
| $TiO_2$ | 0 | 1.0 | 1.5 | 1.5 | 0 | 1.0 |
| MgO | 0 | 0 | 0 | 0 | 2.0 | 0 |
| Flexural strength, ksi | 120 | 107 | 102 | 105.3 | 95.0 | 120.0 |
| Low Temp. stability | Excellent | Excellent | Excellent | Excellent | Weak | Excellent |

TABLE 2-continued

| | Influence of Stabilizers on Zirconia Mole Percent | | | | | |
|---|---|---|---|---|---|---|
| Ingredient | Ex. 1 | Ex. 2 | Ex. 3 | Ex. 4 | Ex. 5 | Ex. 6 |
| Fracture toughness, MPa m$^{\frac{1}{2}}$ | 8-10.5 | 9.6 | n/a | n/a | 7.5 | n/a |
| Hardness, Kg/mm$^2$ | 1050 | 1050 | n/a | n/a | n/a | n/a |
| Thermal shock °C. | 300 | 300 | n/a | n/a | 300 | n/a |
| Abrasion resistance | Excellent | Excellent | n/a | n/a | n/a | n/a |
| Erosion resistance | Excellent | Excellent | n/a | n/a | n/a | n/a |
| Thermal expansion x10$^{-6}$/°C. | 11.0 | 11.0 | n/a | n/a | 11.0 | 11.0 | n/a = not available

Table 2 shows the general over-all improvement to a zirconia shape provided by stabilizers according to the present the invention. Examples 1-4 and 6 demonstrate the invention. Example 5 is a control and shows the result when one of the three required stabilizers is omitted, in this case, dysprosia. Note that the omission results in destabilization as seen by the weak low temperature stability for Example 5.

From a comparison Examples 1-3, it is seen that yttria enhances the flexural strength. From a comparison of Examples 1 and 5 it is seen that dysprosia enhances fracture toughness and low temperature stability. Ceria, from other studies, has been found to enhance the low temperature stability.

It is understood that the foregoing detailed description is given merely by way of illustration and that many variations may be made therein without departing from the spirit of this invention.

What is claimed is:

1. A stabilized tetragonal ziroconia composition comprised on a molar basis of:
   (A) between 0.3 - 1.3 percent dysprosia;
   (B) between 7.0 - 8.5 percent ceria;
   (C) a third stabilizer selected from the group consisting of
      (i) between 0.5 - 0.8 percent yttria;
      (ii) between 0.8 - 1 5 percent titania; and
      (iii) mixtures thereof containing up to a combined total of 2.3 percent; and
   (D) the balance being tetragonal zirconia.

2. Composition according to claim 1, wherein the composition comprises
   (A) between 0.3- 1.0 percent dysprosia;
   (B) between 8.0 - 8.5 percent ceria;
   (C) a third stabilizer selected from the group consisting of
      (i) between 0.5-0.6 percent yttria;
      (ii) between 0.9-1.0 percent titania; and
      (iii) mixtures thereof containing up to a combined total of 1.6 percent; and
   (D) the balance being tetragonal zirconia.

3. Composition according to claim 2, wherein
   dysprosia is 0.3 percent;
   ceria is 8.5 percent; and
   yttria is 0.5 percent.

4. Composition according to claim 1, wherein
   dysprosia is 1.0 percent;
   ceria is 7.0 percent; and titania is 1.0 percent.

5. Shaped ceramic article comprising a stabilized zirconia composition comprised on a molar basis of:
   (A) between 0.3 - 1.3 percent dysprosia;
   (B) between 7.0 - 8.5 percent ceria;
   (C) a third stabilizer selected from the group consisting of
      (i) between 0.5-0.8 percent yttria;
      (ii) between 0.8-5 percent titania; and
      (iii) mixtures thereof containing up to a combined total of 2.3 percent; and
   (D) the balance being tetragonal zirconia.

6. Shaped ceramic article according to claim 5 comprising the stabilized zirconia composition which comprises:
   (A) between 0.3-1.0 percent dysprosia;
   (B) between 8.0-8.5 percent ceria;
   (C) a third stabilizer selected from the group consisting of
      (i) between 0.5-0.6 percent yttria;
      (ii) between 0.9-1.0 percent titania; and
      (iii) mixtures thereof containing up to a combined total of 1.6 percent; and
   (D) the balance being tetragonal zirconia.

7. Shaped ceramic article according to claim 6 comprising the stabilized zirconia composition wherein
   dysprosia is 0.3 percent;
   ceria is 8.5 percent; and
   yttria is 0.5 percent.

8. Shaped ceramic article according to claim 5 comprising the stabilized zirconia composition wherein
   dysprosia is 1.0 percent;
   ceria is 7.0 percent; and
   titania is 1.0 percent.

9. Shaped ceramic article according to claim 5, wherein the article is a grinding ball, a die, a check valve, a valve tappet wear button, a valve seat, an oxygen sensor sleeve, a diesel piston cap, or a diesel precombustion chamber element.

10. Article according to claim 9, wherein composition comprises
    (a) between 0.3-1.0 percent dysprosia;
    (b) between 8.0-8.5 percent ceria;
    (c) a third stabilizer selected from the group consisting of
       (i) between 0.5-0.6 percent yttria;
       (ii) between 0.9 - 1.0 percent titania; and
       (iii) mixtures thereof containing up to a combined total of 1.6 percent; and
    (d) balance being tetragonal zirconia.

11. Article according to claim 10, wherein the composition consists essentially of
    (a) 0.3 percent dysprosia;
    (b) 8.5 percent ceria;
    (c) 0.5 percent yttria; and
    (d) 90.7 percent tetragonal zirconia 12. Article according to claim 10, wherein the composition consists essentially of
    (a) 0.8 percent dysprosia;
    (b) 8.0 percent ceria;
    (c) 1.5 percent titania; and
    (d) 88.7 percent tetragonal zirconia.

* * * * *

UNITED STATES PATENT AND TRADEMARK OFFICE
CERTIFICATE OF CORRECTION

PATENT NO. : 4,891,343

DATED : January 2, 1990

INVENTOR(S) : Tariq Quadir

It is certified that error appears in the above-identified patent and that said Letters Patent is hereby corrected as shown below:

On the front page correct entry 75 to read:

75 Inventor: Tariq Quadir, Columbia, MD.

Claim 1: Part (c) (ii) change 15 to 1.5.

Signed and Sealed this

Eighth Day of January, 1991

Attest:

HARRY F. MANBECK, JR.

*Attesting Officer*     *Commissioner of Patents and Trademarks*